US012632349B2

(12) United States Patent
Kothiyal et al.

(10) Patent No.: US 12,632,349 B2
(45) Date of Patent: May 19, 2026

(54) RESYNC TRANSFER FOR RECOVERING FROM STORAGE SITE FAILURE UTILIZING BACKGROUND SCANNER

(71) Applicant: NetApp, Inc., San Jose, CA (US)

(72) Inventors: Rachita Kothiyal, San Jose, CA (US); Atul Ramesh Pandit, Los Gatos, CA (US); Abhishek Naidu, San Jose, CA (US); Anil Kumar Ponnapur, Sunnyvale, CA (US); Tijin George, San Jose, CA (US)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 18/541,482

(22) Filed: Dec. 15, 2023

(65) Prior Publication Data

US 2025/0199921 A1     Jun. 19, 2025

(51) Int. Cl.
*G06F 11/16* (2006.01)

(52) U.S. Cl.
CPC .... *G06F 11/1662* (2013.01); *G06F 2201/805* (2013.01)

(58) Field of Classification Search
CPC ................................................ G06F 11/1662
See application file for complete search history.

(56) References Cited

U.S. PATENT DOCUMENTS

| | | | |
|---|---|---|---|
| 7,308,545 B1 * | 12/2007 | Kekre | ................ G06F 11/2097 711/161 |
| 8,010,758 B1 | 8/2011 | Bezbaruah et al. | |
| 8,099,571 B1 | 1/2012 | Driscoll et al. | |
| 10,360,099 B2 | 7/2019 | Subramanian et al. | |
| 10,521,143 B2 | 12/2019 | Subramanian et al. | |
| 11,036,420 B2 | 6/2021 | Thoppil et al. | |
| 11,048,430 B2 | 6/2021 | Thoppil et al. | |
| 11,132,339 B2 | 9/2021 | Kaushik et al. | |
| 11,151,162 B2 | 10/2021 | Narasingarayanapeta et al. | |
| 11,210,013 B2 | 12/2021 | Thoppil et al. | |

(Continued)

OTHER PUBLICATIONS

"FabricPool tier management", NetApp, URL: https://docs.netapp.com/us-en/ontap/pdfs/sidebar/FabricPool_tier_management.pdf, Apr. 16, 2024, 58 pages.
"HA pair management", NetApp, URL: https://docs.netapp.com/us-en/ontap/pdfs/sidebar/HA_pair_management.pdf, Apr. 16, 2024, 26 pages.
"SVM data mobility", NetApp, URL: https://docs.netapp.com/us-en/ontap/pdfs/sidebar/SVM_data_mobility.pdf, Apr. 16, 2024, 14 pages.

(Continued)

*Primary Examiner* — Jigar P Patel
(74) *Attorney, Agent, or Firm* — COOPER LEGAL GROUP LLC

(57) ABSTRACT

Techniques are provided for performing a resync transfer to recover from a storage site failure. During normal operation of a first site hosting a first volume, data is replicated to a second volume hosted by a second site. If the first site fails, when clients are redirected to the second volume at the second site. When the first site recovers, data modifications made to the second volume are resynced back to the first volume. As part of synchronizing the first volume, a data warehouse is rebuilt at the first site in order to track the location of blocks present on the replication destination. Typically, the data modifications are transferred after the data warehouse is rebuilt, which results in significantly long resync times. The techniques provided herein decrease the resync time by either rebuilding the data warehouse in parallel with resyncing the data modifications or circumvent the need for rebuild.

20 Claims, 11 Drawing Sheets

(56) References Cited

U.S. PATENT DOCUMENTS

| | | | | |
|---|---|---|---|---|
| 11,615,001 | B2 | 3/2023 | Naidu et al. | |
| 11,650,886 | B2 | 5/2023 | Mathew et al. | |
| 11,853,104 | B2 | 12/2023 | Naidu et al. | |
| 12,386,714 | B2 | 8/2025 | Kothiyal et al. | |
| 2005/0144202 | A1* | 6/2005 | Chen | G06F 16/1844 |
| | | | | 714/E11.107 |
| 2010/0115215 | A1 | 5/2010 | Rosychuk | |
| 2014/0344526 | A1* | 11/2014 | Brown | G06F 11/1458 |
| | | | | 711/141 |
| 2016/0328303 | A1 | 11/2016 | Brandner et al. | |
| 2017/0091057 | A1 | 3/2017 | Ramasubramaniam et al. | |
| 2017/0161308 | A1 | 6/2017 | Jarvis | |
| 2019/0384506 | A1* | 12/2019 | Shivanand | G06F 3/0659 |
| 2021/0240348 | A1* | 8/2021 | Xiong | G06F 3/065 |
| 2023/0029465 | A1 | 2/2023 | Mallipeddi et al. | |
| 2023/0409535 | A1* | 12/2023 | Kashi Visvanathan | |
| | | | | G06F 21/602 |
| 2025/0199922 | A1 | 6/2025 | Kothiyal et al. | |

OTHER PUBLICATIONS

Corrected Notice of Allowance mailed on May 14, 2025 for U.S. Appl. No. 18/541,507, filed Dec. 15, 2023, 02 pages.

"IBM System Storage SAN Volume Controller and Storewise V700 Replication," IBM, Retrieved from Internet : https://books.google.com/books?id=Pb66AgAAQBAJ&lpg=PR11&ots=xpDsrxBNa7&dq=storage%20failover%20site%20resynchronization%20reverse%20mapping %20&lr&pg=PR11#v=onepage&q&f=false, Mar. 2013, 02 pages.

International Search Report and Written Opinion for Application No. PCT/US2024/060003, mailed on Apr. 22, 2025, 19 pages.

Non-Final Office Action mailed on Dec. 3, 2025 for U.S. Appl. No. 18/541,495, filed Dec. 15, 2023, 15 pages.

Non-Final Office Action mailed on Dec. 18, 2024 for U.S. Appl. No. 18/541,507, filed Dec. 15, 2023, 07 pages.

Notice of Allowance mailed on Apr. 9, 2025 for U.S. Appl. No. 18/541,507, filed Dec. 15, 2023, 07 pages.

* cited by examiner

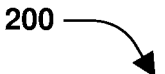

200

REPLICATE DATA FROM FIRST VOLUME HOSTED AT FIRST SITE TO SECOND VOLUME HOSTED AT SECOND SITE — 202

IN RESPONSE TO FIRST SITE FAILING, PROMOTE SECOND VOLUME TO BE PRIMARY VOLUME AND REDIRECT CLIENT I/O TO SECOND VOLUME FOR STORING DATA MODIFICATIONS — 204

IN RESPONSE TO THE FIRST SITE RECOVERING, INITIATE A RESYNC OPERATION TO TRANSFER DATA MODIFICATIONS FROM SECOND VOLUME TO FIRST VOLUME — 206

LOG DATABASE REBUILD OPERATIONS INTO LOG METAFILE — 208

IMPLEMENT BACKGROUND SCANNER TO RECONCILE INFORMATION WITHIN METAFILE FOR REBUILDING DATABASE FILE — 210

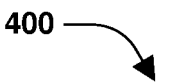

| IN RESPONSE TO FIRST SITE FAILING, PROMOTE SECOND VOLUME TO BE PRIMARY VOLUME AND REDIRECT CLIENT I/O TO SECOND VOLUME FOR STORING DATA MODIFICATIONS | — 402 |

| IN RESPONSE TO THE FIRST SITE RECOVERING, INITIATE A RESYNC OPERATION TO TRANSFER DATA MODIFICATIONS FROM SECOND VOLUME TO FIRST VOLUME | — 404 |

| EVALUATE DATA WAREHOUSE TO IDENTIFY MAPPINGS | — 406 |

| GENERATE REVERSE MAPPINGS FROM THE MAPPINGS WITHIN THE DATA WAREHOUSE | — 408 |

| GENERATE AND SEND COMMANDS, INCLUDING BLOCKS AND REVERSE MAPPINGS FOR BLOCKS, TO FIRST SITE FOR UPDATING FIRST VOLUME | — 410 |

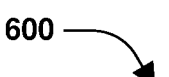

IN RESPONSE TO FIRST SITE FAILING, PROMOTE SECOND VOLUME TO BE PRIMARY VOLUME AND REDIRECT CLIENT I/O TO SECOND VOLUME FOR STORING DATA MODIFICATIONS — 602

IN RESPONSE TO THE FIRST SITE RECOVERING, INITIATE A RESYNC OPERATION TO TRANSFER DATA MODIFICATIONS FROM SECOND VOLUME TO FIRST VOLUME — 604

EXECUTE BACKGROUND SCANNER TO REBUILD DATA WAREHOUSE — 606

OBTAIN SOURCE VIRTUAL VOLUME BLOCK NUMBERS FROM FIRST SITE — 608

IN RESPONSE TO DATA WAREHOUSE NOT COMPRISING MAPPING BETWEEN CHANGED VIRTUAL VOLUME BLOCK NUMBER AND SOURCE VIRTUAL VOLUME BLOCK NUMBER, CREATE ENTRY WITHIN DATA WAREHOUSE — 610

904 COMPUTER INSTRUCTIONS 906
01011010001010
10101011010101
101101011100...

908 COMPUTER READABLE MEDIUM

RESYNC TRANSFER FOR RECOVERING FROM STORAGE SITE FAILURE UTILIZING BACKGROUND SCANNER

BACKGROUND

Many storage environments implement data replication and/or other redundancy data access techniques for data loss protection and non-disruptive client access. For example, a first storage site provides clients with primary access to data stored within a first volume. The data is replicated to a second volume maintained at a second storage site. If there is a failure at the first storage site, then clients are switched over to access the data from the second volume at the second storage site. This is performed as a switchover operation from the first storage site to the second storage site. If the first storage site recovers from the failure, then a switchback operation is performed. As part of the switchback operation, the first volume is resynced with the second volume by a resync operation because data modifications may have occurred at the second volume while the first volume was inaccessible. Once the first volume is resynchronized with the second volume, the clients are switched back to accessing the data through the first volume.

DESCRIPTION OF THE DRAWINGS

FIG. 2 is a flow chart illustrating an example method for performing a resync transfer to recover from a site failure in accordance with an embodiment of the present technology.

FIG. 4 is a flow chart illustrating an example method for performing a resync transfer to recover from a site failure in accordance with an embodiment of the present technology.

FIG. 6 is a flow chart illustrating an example method for performing a resync transfer to recover from a site failure in accordance with an embodiment of the present technology.

DETAILED DESCRIPTION

Figure 1A:
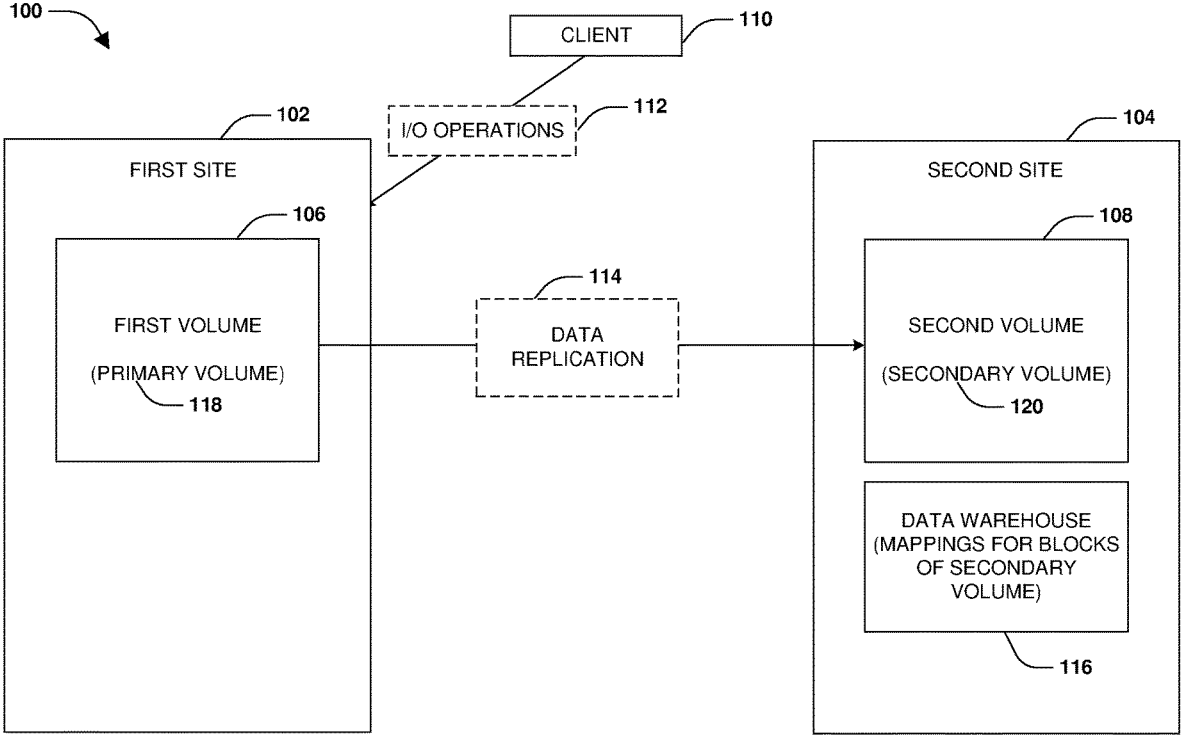
FIG. 1A is a block diagram illustrating an example of performing data replication from a first site to a second site in accordance with an embodiment of the present technology.

Some examples of the claimed subject matter are now described with reference to the drawings, where like reference numerals are generally used to refer to like elements throughout. In the following description, for purposes of explanation, numerous specific details are set forth to provide an understanding of the claimed subject matter. It may be evident, however, that the claimed subject matter may be practiced without these specific details. Nothing in this detailed description is admitted as prior art.

A storage environment stores data across various storage sites such as for data redundancy, failover protection, and other types of data protection. The storage environment includes a first site (e.g., an on-premises computing environment, a cloud computing environment, a virtual machine, a storage virtual machine, a containerized environment, a storage controller, a node, or other hardware and/or software implemented as a primary storage site) that hosts a first volume as a primary volume that is made accessible for client access. A second site (a secondary storage site) hosts a second volume maintained as a secondary volume that is a backup copy of the primary volume. Data of the primary volume is replicated to the secondary volume so that the secondary volume mirrors the primary volume. Thus, if the first site fails, then clients are redirected to the secondary volume at the second site as part of a failover operation for non-disruptive access to client data.

During a disaster where the first site has a failure and the first volume is not available to clients for accessing the client data, the second site performs a promote operation and transitions the second volume from being the secondary volume to being the primary volume now available for client access through the second site. In this way, the clients can now access the client data through the second volume that has been promoted as the primary volume as part of disaster recovery for the first site. Over time, data modifications are made to the second volume that are not replicated to the first volume because of the failure of first site.

Once the first site recovers, a resync operation (a reverse resync transfer) is performed to replicate and protect the data modifications made to the second volume by transferring the data modifications to the first volume (currently demoted as the secondary volume). Eventually, client access is restored to first volume that is then promoted back to being the primary volume, and the second volume is demoted back to being the secondary volume that is a data protection copy of the primary volume. The resync operation is the process of bringing the primary and secondary volumes in sync where the primary and secondary volumes are storing the same data so that data protection can be restored for the first volume because the first volume and the second volume mirror one another after the resync operation.

A replication engine that replicates data from the primary volume to the secondary volume maintains a data warehouse for the secondary volume. The data warehouse is a database or map of data blocks present on the secondary volume. That is, the data warehouse tracks the locations of each data block on the secondary volume (e.g., tracking virtual volume block numbers such as a virtual volume block number of a data block on the secondary volume that is mapped to a virtual volume block number of a corresponding block on the primary volume that stores the same data). The data warehouse is used to deduplicate and share data blocks because the data warehouse can be used to track when there are multiple references to the same data block (e.g., multiple files referring to the same data block).

During the disaster recovery, the replication engine processes the data warehouse at the second site to create virtual volume block number (VVBN) mappings from the second volume (primary volume) to the first volume (secondary volume). The mappings are transmitted as replication operations from to the first site, and are populated as entries within the data warehouse being rebuilt. This enables the ability to share data blocks (e.g., sharing between a data warehouse file block number and a container file of the first volume) such that further transfers can share the existing blocks in order to preserve storage efficiency (e.g. if a data block of data is being resynced to the first volume that already comprises that data, then the data is not redundantly stored again but a reference is created to indicate that the data is now pointed to by multiple sources.

Unfortunately, data sharing consumes a significant amount of time during the resync operation. The replication engine performs resync transfers that would have to rebuild the entire data warehouse at the first site for the first volume (currently demoted to being the secondary volume) that will be updated with the data modifications of the second volume that is currently promoted to being the primary volume. Because the entire data warehouse must be rebuilt for the entire volume and not just for the data modifications, the resync transfer times are proportional to the size of the entire volume. Because volumes can be tends to hundreds of TBs, it is difficult if not impossible for the replication engine to satisfy disaster recovery service level objectives. Thus, the rebuilding of the data warehouse is a long running process that can take a substantial amount of time (e.g., hours to days) that exceeds the disaster recovery service level objects of clients. Furthermore, the data warehouse is rebuilt before the data modifications are transferred from the second volume to the first volume, which also increases the overall resync operation. Because the replication engine can be used as a common transfer engine for other processes such as asynchronous replication, synchronous replication, and Vserver migration use cases, the longer resync times become a broad problem.

Figure 1B:
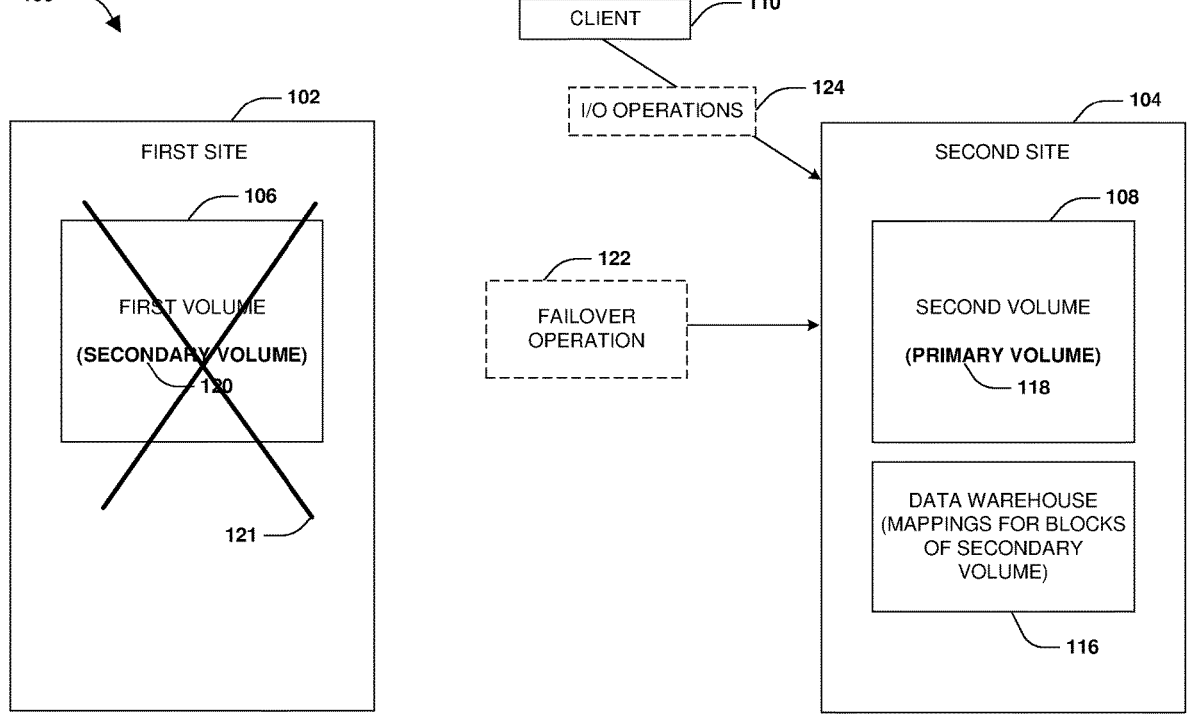
FIG. 1B is a block diagram illustrating an example of performing a failover operation in accordance with an embodiment of the present technology.
Figure 1C:
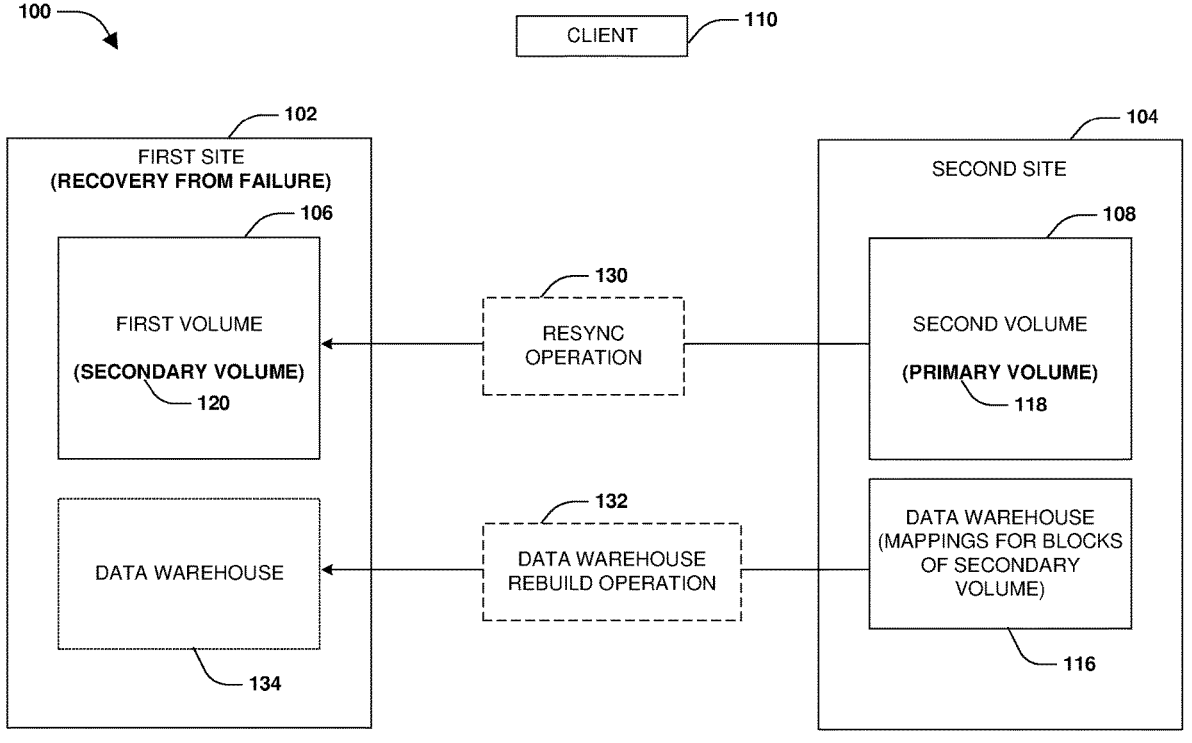
FIG. 1C is a block diagram illustrating an example of performing a resync operation in accordance with an embodiment of the present technology.

FIGS. 1A-1C are block diagrams illustrating an example of a system 100 for performing data replication from a first site 102 to a second site 104, a failover operation, and resync and data warehouse rebuilt operations. The first site 102 hosts a first volume 106 as a primary volume 118 that is made accessible to clients such as for processing I/O operations 112 from a client 110, as illustrated by FIG. 1A. The second site 104 may maintain a second volume 108 as a secondary volume 120 that is a standby backup for the first volume 106. In this way, data replication 114 is performed to replicate data from the first volume 106 to the second volume 108 (e.g., synchronous replication, asynchronous replication, etc.). A data warehouse 116 is maintained at the second site 104 for the secondary volume 120. The data warehouse 116 is used to track the location of blocks of the secondary volume 120. The data warehouse 116 may include mappings for the blocks of the secondary volume 120 such as a mapping of virtual volume block numbers used by the primary volume 118 to virtual volume block numbers used by the secondary volume 120.

The first site 102 may experience a failure 121 such that the first volume 106 is no longer available to the clients, as illustrated by FIG. 1B. Accordingly, a failover operation 122 is performed to failover the clients such as I/O operations 124 of the client 110 to the second volume 108 hosted at the second site 104. As part of the failover operation 122, the second volume 108 is promoted to be the primary volume 118 and the first volume 106 will be demoted to be the secondary volume 120. In this way, clients are provided with non-disrupted access to client data through the second site 104 and the second volume 108.

The first site 102 recovers from the failure, as illustrated by FIG. 1C. The second volume 108 is the primary volume 118 and the first volume 106 is the secondary volume 120. In order to eventually switch the clients back to accessing client data through the first volume hosted by the first site 102, a resync operation 130 will be performed to synchronize data modifications (e.g., the second volume 108 may be modified while the second volume 108 is the primary volume 118 being accessed by the clients) of the second volume 108 to the first volume 106 in order to synchronize the first volume 106 to the second volume 108. As part of resyncing the first volume 106 with the data modifications of the second volume 108, a data warehouse 134 is rebuilt, by a data warehouse rebuild operation 132, at the first site 102 for tracking mappings of virtual volume block numbers between the first volume 106 and the second volume 108 so that block sharing and deduplication is implemented for the first volume 106. Various embodiments of the overall resync transfer from the second volume 108 to the first volume 106 are further discussed in relation to FIGS. 2-7.

The techniques provide herein are capable of reducing the time to perform the resync transfer from hours/days down to minutes. Instead of rebuilding/populating the data warehouse at the first site and waiting to transfer the data modifications from the second volume to the first volume until the data warehouse is rebuilt, the disclosed technique logs virtual volume block number mappings into a log metafile in parallel with the data modifications being resync from the second volume to the first volume.

In some embodiments of the disclosed techniques, the resync transfer is initiated. During the resync transfer, virtual volume block number mappings (e.g., mappings from virtual volume block numbers of the second volume to virtual volume block numbers of the first volume) are logged into a log metafile. In some embodiments, the log metafile is a flat file that is indexed by virtual volume block numbers of the second volume, with a payload as virtual volume block numbers from the first volume. The indexes are at fixed offsets, which provides for the ability to identify an index very quickly such as within a constant time. In some embodiments, a maximum number of indices is set or dependent on a largest virtual volume block number from the second volume. In some embodiments, the log metafile is a volume metafile that is captured by snapshots of a volume such as the first or second volume. Once all virtual volume block number mappings are log into the log metafile, the resync transfer is declared complete. At this point, transfers of the data modifications from the second volume to the first volume can proceed. This reduces the delay in starting the data transfers because the entire data warehouse does not need to be rebuilt before the data modification transfers can occur.

A scanner (e.g., a background scanner) is implemented to process (drain) virtual volume block number mappings (entries) from the log metafile. The scanner processes the entries within the log metafile asynchronously with respect to the resync transfer that is transferring blocks of data modifications from the second volume to the first volume. For each mapping from a virtual volume block number of the second volume to a virtual volume block number of the first volume, a block share is performed such as between a data warehouse file block number of the second volume (a data warehouse FBN) and a container file block number of the first volume. A container file holds blocks of a volume, and thus the container file block number references the container file holding the blocks of the first volume. This block sharing is essentially populating entries in the data warehouse in order to rebuild the data warehouse at the first site. Once complete, the log metafile is deleted.

Various operations are implemented for the log metafile. In some embodiments, a look up to the log metafile is performed by a push replication operation (a replication operation). When the data modification transfers start/re-sume from the second volume to the first volume and replication operations are received, a lookup is performed within the data warehouse and also the log metafile. If an entry is located, then block sharing with that corresponding container file block number is performed. The entry within the log metafile can be retained because the scanner will subsequently process the entry while rebuilding the data warehouse. Thus, there is merely a constant time lookup cost to the log metafile for the resync transfers. In some embodi-ments, file buffers are loaded into memory on an as needed basis. Given that the log metafile is relatively dense with mappings, locality is leveraged for cache/memory.

In some embodiments, a push name free operation is performed for when a virtual volume block number is no longer is use. For example, a resync transfer (a rebuild transfer) from the second volume to the first volume is performed using a first snapshot (S1). In this example, the snapshot (S1) has a first file referring to a first virtual volume block number (V1). The log metafile has been populated, but not yet processed (drained) where mappings (entries) within the log metafile have not yet been fully processed to rebuild the data warehouse. A second snapshot (S2) captures a state where the first file has been deleted. As such, the virtual volume block number (V1) is freed within the second snapshot (S2). The second snapshot (S2) is transferred from the second volume to the first volume. At this point, the log metafile is still not fully processed (drained). A push name free operation is received for the virtual volume block number (V1), and a push inode operation to delete the first file and remove references of the virtual volume block number (V1) is received. First, the data warehouse on the first site is checked. If a mapping is identified, then the push name free operation is processed to free the virtual volume block number (V1). Next, the log metafile is checked. If the log metafile has a mapping for the virtual volume block number (V1), then the mapping is invalidated by writing a virtual block number (VBN) hole as a payload.

In some embodiments, a push name data operation is performed. In an example, a virtual volume block number of the push name data operation is a new allocation of a block in an incremental resync transfer and was not previously allocated. Accordingly, there is no existing mapping in the data warehouse nor in the log metafile. Logic for processing the push name data operation is configured to handle this situation. In another example, a virtual volume block num-ber is freed and reallocated. For example, a rebuild (resync) transfer from the second site to the first site is performed using a first snapshot (S1). In this example, the first snapshot (S1) has a first file and a second file that both refer to a virtual volume block number (V1). The log metafile is populated with mappings, but has not yet been fully pro-cessed (drained). A second snapshot (S2) captures a state where the first file has been deleted. So, only the second file is referring to the virtual volume block number (V1) on the second volume. The second snapshot (S2) is transferred from the second site to the first volume. At this point, the log metafile is still not fully processed (drained). Now, the second file is deleted and the first snapshot (S1) is deleted on the second site. The virtual volume block number (V1) is now free on the second volume. A new file (a third file) is created, and the virtual volume block number (V1) is allocated again for use by the new file. A third snapshot (S3) is created and transferred to the first site. This will result in a push name data operation for the virtual volume block number (V1). There could be an entry for the virtual volume block number (V1) in the data warehouse or in the log metafile, or both. An update is performed for the data pointed to by the virtual volume block number (V1) without allocating a new virtual volume block number. A new virtual volume block number is not allocated so that any replication operations that also arrived in the transfer at any point in time can use a valid mapping. This is because if a mapping exists in both the data warehouse and the log metafile, the mappings are to match.

In some embodiments, a push name reuse operation is performed. When the push name reuse operation is received, a block share is performed with a virtual volume block number from an older snapshot. The data warehouse is evaluated from the older snapshot in order to resolve a mapping. If the mapping does not exist, then the log metafile is checked to resolve the mapping.

A snapshot difference operation may interact with the log metafile. If a new resync (a flip resync now from the first site and first volume to the second site and the second volume), then the snapshot difference operation generates mappings (references) from the first volume to the second volume, and sends the mappings to the second site. In addition to evaluating the data warehouse for the mappings, the snap-shot difference operation evaluates the log metafile, if the log metafile exists, and also transfers the mappings within the log metafile.

In some embodiments, transfers are started without wait-ing for the rebuild of the data warehouse. The rebuild transfer to rebuild the data warehouse could be executed as a separate scanner in parallel with the data (data modifica-tion transfer) and reference (mappings transfer) phase of the overall resync transfer. This allows the transfer to start immediately on the flip resync and there is no delay for the data warehouse rebuild phase to complete.

Data warehouse mappings could be logged in parallel with the processing of other operations for the overall resync transfer. A rebuild scanner that rebuilds the data warehouse operates on a reference snapshot, while the transfer pertains to incremental changes (data modifications) between the reference snapshot and a transfer snapshot. The rebuild scanner is operating in the background to process (drain) the mappings (entries) from the log metafile to create mappings (entries) in the data warehouse. In some embodiments, the transfer is declared complete when the rebuild scanner finishes logging the mappings to the log metafile, and the data (data modification transfer) and reference (mappings transfer) phase are complete. In some embodiments, the rebuild scanner includes both logging and reconciliation functionality that occur in parallel with the data modification transfers such that a current or future data modification data transfer does not wait on the rebuild scanner to either start or finish. In this way, the time taken for end-to-end transfer completion merely includes the data and reference phase, and remains completely independent of the resync rebuild phase of the data warehouse (e.g., part of the transfer can vary in transfer time depending upon an amount of logging rebuild that is done based upon data set sizes). This provides a technical solution for making a resync transfer time dependent only on incremental snapshot delta (e.g., data modifications as opposed to data of the entire volume).

The rebuild scanner executes in parallel with transfers that occur only for the first transfer done as part of the flip resync transfer. This parallel scenario may affect replay operations that interact with the log metafile during the first transfer. In some embodiments, a push replication operation (replay operation) is implemented. A replication operation first checks the data warehouse for a mapping. If the mapping does not exist, then the log metafile is checked for the mapping. If the mapping is also not found in the log metafile such as because the rebuild transfer has not completed, then the replication operation is buffered (e.g., queued into a queue). Once the data phase (data modification transfer/resync) for the transfer finishes and the rebuild phase to rebuild the data warehouse finished, then the buffered replication operation and/or other buffered replication operations are replayed. As part of replay, the data warehouse is first checked, and then the log file is checked. If a match is found, then block sharing is implemented. Otherwise, the block does not already exist at the first site and is pulled from the second site.

In some embodiments, a push name free operation may be implemented. If the push name free operation arrives before the rebuild transfer inserts a mapping into the data warehouse, then it cannot be determined as to which local virtual volume block number to free. Accordingly, a VBN hole is inserted as a mapping into the log metafile. Subsequently when the mapping is obtained as part of the rebuild scanner, the VBN hole overrides the incoming mapping. If there is a mapping in the log metafile when the push name free operation is received, then the push name free operation is processed and the mapping is invalidated by inserting a VBN hole in place of the mapping. In some embodiments, a push name data operation is received for the first transfer, and belongs to new blocks that are allocated between the reference snapshot (a common snapshot capture a state of the first volume and the second volume when both values are storing the same data) and the incremental snapshot of the secondary volume. Because there is no dependency between the push name data operation and the log metafile, the push name data operation is processed such that a block is allocated and shared with the data warehouse (a data warehouse file used to store/represent the data warehouse).

Figure 3:
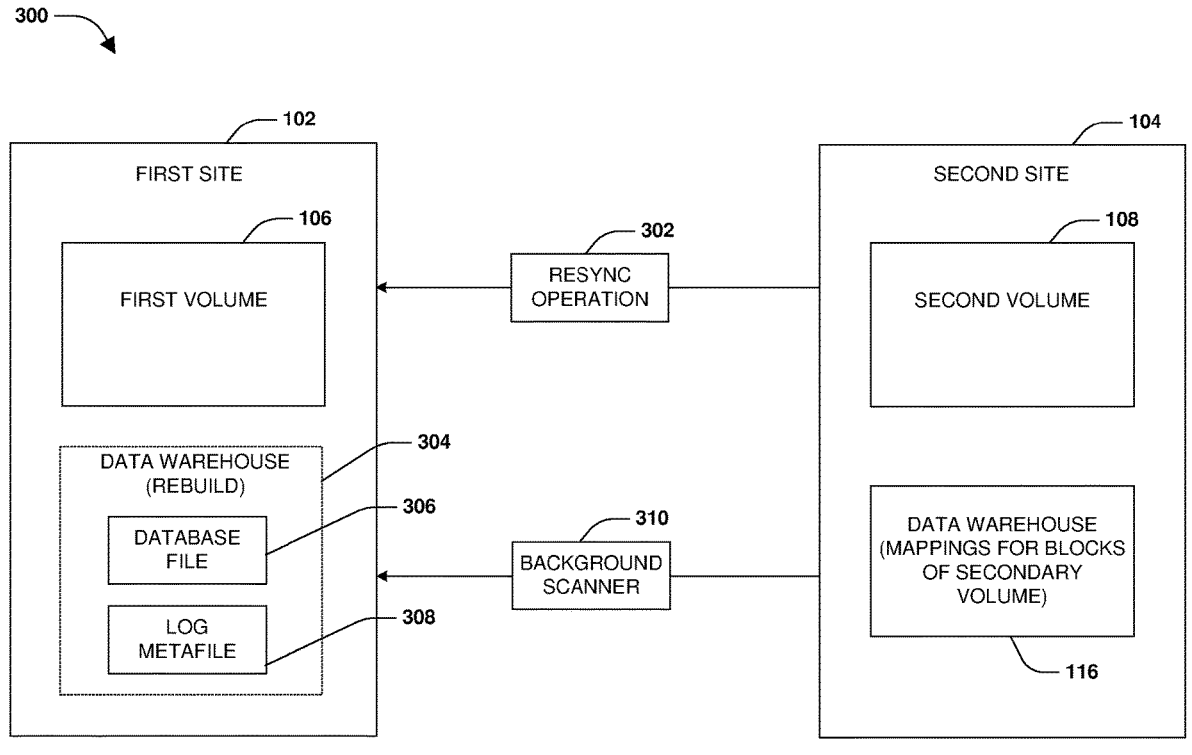
FIG. 3 is a block diagram illustrating an example of a system for performing a resync transfer to recover from a site failure in accordance with an embodiment of the present technology.

FIG. 2 is a flow chart illustrating an example method 200 for performing a resync transfer to recover from a site failure, which is described in conjunction with system 300 of FIG. 3. During operation 202 of method 200, data is replicated from the first volume 106 hosted at the first site 102 as a primary volume to the second volume 108 hosted at the second site 104 as a secondary volume. While the first volume 106 is hosted as the primary volume, client I/O operations are directed to the primary volume. In some embodiments, the client I/O operations or data of the first volume 106 is replicated (e.g., synchronous replication or asynchronous replication) to the second volume 108 so that the second volume 108 mirrors the first volume 106. The data warehouse 116 is maintained at the second site 104 for the secondary volume 120. The data warehouse 116 is used to track the location of blocks of the secondary volume 120. The data warehouse 116 is populated with mappings of virtual volume block numbers used by the primary volume such as the first volume 106 to virtual volume block numbers used by the secondary volume such as the second volume 108.

A failure may occur at the first site 102 such that the first volume 106 is no longer accessible for client access. In response to the first site 102 experiencing the failure, the second volume 108 is promoted to be the primary volume and client I/O operations are redirected to the second volume 108, during operation 204 of method 200. Some of the client I/O operations (e.g., write operations, delete operations, create operations, etc.) may result in data modifications to the second volume 108 such that the second volume 108 diverges from the first volume 106. In this way, the data warehouse 116 tracks virtual volume block numbers of blocks storing data of the second volume 108 in relation to virtual volume block numbers of corresponding blocks of the first volume 106.

At a subsequent point in time, the first site 102 recovers such that the first volume 106 becomes available for resynchronization with the second volume 108, as illustrated by FIG. 3. In response to the first site 102 recovering, a resync operation 302 is initiated to transfer the data modifications from the second volume 108 to the first volume 106 so that the first volume 106 can be re-promoted to be the primary volume after being resynced, during operation 206 of method 200. During the resync operation 302, database rebuild operations are logged into a log metafile 308, during operation 208 of method 200. The database rebuild operations are used to rebuild a database file 306 used to track blocks that are shared by files of the first volume 106 and/or the second volume 108. In some embodiments, virtual volume block numbers of the second volume 108 are received from the second site 104 as part of the database rebuild operations. The virtual volume block numbers are logged into the log metafile 308 that is indexed by the virtual volumes block numbers. The indexes are at fixed offsets and a maximum number of indices is derived from a largest virtual volume block number from the second site 104 for the second volume 108. In some embodiments, virtual volume block numbers from the second site 104 are logged into the log metafile indexed by the virtual volume block numbers and are mapped to virtual volume block numbers used by the first site 102. In this way, virtual volume block number mappings between the first volume 106 and the second volume 108 are logged within the log metafile 308. The log metafile 308 can be evaluated to determine whether a block has been processed as part of the resync operation 302 (e.g., whether a block comprising a data modification has been replicated from the second volume 108 to the first volume 106).

During operation 210 of method 200, a background scanner 310 is implemented to reconcile information within the log metafile 308 for rebuilding the database file 306. The background scanner 310 is implemented to process (drain) virtual volume block number mappings (entries or map entries) from the log metafile 308. The background scanner 310 processes the entries within the log metafile 308 asynchronously such as with respect to the resync operation 302. For each mapping from a virtual volume block number of the second volume 108 to a virtual volume block number of the first volume 106, a block share is performed such as between a data warehouse file block number of the second volume 108 (a data warehouse FBN) and a container file block number of the first volume 106. This block sharing is essentially populating entries in the database file 306 in order to rebuild a data warehouse 304 at the first site 102.

In some embodiments, the data warehouse 304 is represented by both the database file 306 and the log metafile 308 until the background scanner 310 has finished. In this way, both the log metafile 308 and the database file 306 are used together to obtain a consistent state of the first volume 106 and/or the second volume 108 (e.g., used to identify deduplicated data such as where multiple files share the same block of data). For example, the log metafile 308 and the database file 306 are used to deduplicate blocks storing data of the first volume 106 such as by tracking what blocks are referenced by more than one file. In some embodiments, the background scanner 310 asynchronously processes mappings (entries or map entries) within the log metafile 308. For a map entry that maps a virtual volume block number from the second volume 108 to a virtual volume block number of the first volume 106, a block share is performed between a file block number (e.g., a file block number of the data warehouse 116 of the second volume 108) to a container file block number associated with the first volume 106.

Once the background scanner 310 has completed, the log metafile 308 is deleted, and the data warehouse 304 is now represented by the database file 306 (e.g., the database file 306 becomes the data warehouse 304). The data warehouse 304 is used to track locations of blocks within the first volume 106 and/or the second volume 108 such as by mapping virtual volume block numbers used by the primary volume such as the second volume 108 to virtual volume block numbers used by the secondary volume such as the first volume 106.

In response to the resync operation 302 completing, the second volume 108 is demoted to become the secondary volume and the first volume 106 is promoted to become the primary volume for client access. The resync operation 302 may be specified as complete in response to all virtual volume block numbers from the second site 104 being logged into the log metafile 308, thus all virtual volume block numbers are accounted for between the log metafile 308 and the database file 306 as being reconciled by the background scanner 310.

In some embodiments of the disclosed techniques, virtual volume block number mappings are embedded within replication operations during transfer instead of performing a separate data warehouse rebuild phase. That is, instead of implementing a separate data warehouse rebuild phase for sending over mappings of virtual volume block numbers between the secondary volume and the primary volume, such information is embedded into operations/commands (e.g., replication operations, replay operations, etc.) during the transfer.

In an example where the replication relationship is flipped, transfers are being performed from the second volume to the first volume. A data warehouse is located at the second site, and is captured in a reference snapshot that has mappings of virtual volume block numbers from the first volume to virtual volume block numbers of the second volume. During the transfer from the second volume to the first volume, replication operations are generated to describe an inode number, an offset, and virtual volume block numbers of the second volume. As provided herein, corresponding virtual volume block numbers of the first volume can be also be included within the replication operations to map to the virtual volume block numbers of the second volume. This provides the ability for block sharing with the virtual volume block numbers of the first volume when the replication operation arrives, without the need to have a data warehouse at the second site (the destination site of the replication operation). However, the existing mappings at the second site are from the first volume to the second volume. Accordingly, an efficient lookup of mappings from the second volume to the first volume is performed. Some virtual volume block numbers of the second volume may not have mappings within the data warehouse. These virtual volume block numbers are not present on the first volume, and were newly allocated in the current incremental transfer. Accordingly, a push name data operation is sent for these virtual volume block numbers for block sharing.

Figure 5:
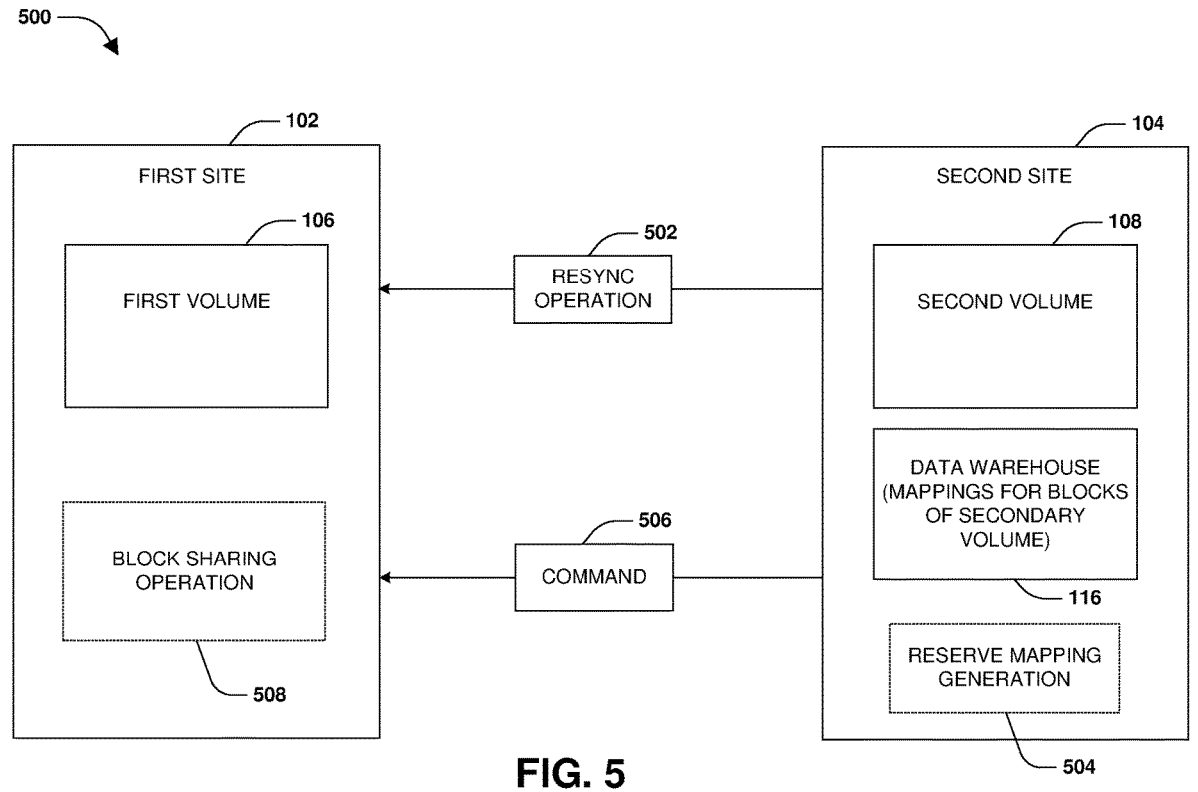
FIG. 5 is a block diagram illustrating an example of a system for performing a resync transfer to recover from a site failure in accordance with an embodiment of the present technology.

FIG. 4 is a flow chart illustrating an example method 400 for performing a resync transfer to recover from a site failure, which is described in conjunction with system 500 of FIG. 5. During operation 402 of method 400, data is replicated from the first volume 106 hosted at the first site 102 as a primary volume to the second volume 108 hosted at the second site 104 as a secondary volume. While the first volume 106 is hosted as the primary volume, client I/O operations may be directed to the primary volume. In some embodiments, the client I/O operations or data of the first volume 106 is replicated (e.g., synchronous replication or asynchronous replication) to the second volume 108 so that the second volume 108 mirrors the first volume 106. The data warehouse 116 is maintained at the second site 104 for the secondary volume 120. The data warehouse 116 is used to track the location of blocks of the secondary volume 120. The data warehouse 116 is populated with mappings of virtual volume block numbers used by the primary volume such as the first volume 106 to virtual volume block numbers used by the secondary volume such as the second volume 108.

A failure may occur at the first site 102 such that the first volume 106 is no longer accessible for client access. In response to the first site 102 experiencing the failure, the second volume 108 is promoted to be the primary volume and client I/O operations are redirected to the second volume 108, during operation 404 of method 400. Some of the client I/O operations (e.g., write operations, delete operations, create operations, etc.) may result in data modifications to the second volume 108 such that the second volume 108 diverges from the first volume 106. In this way, the data warehouse 116 tracks virtual volume block numbers of blocks storing data of the second volume 108 in relation to virtual volume block numbers of corresponding blocks of the first volume 106.

At a subsequent point in time, the first site 102 recovers such that the first volume 106 becomes available for resynchronization with the second volume 108, as illustrated by FIG. 5. In response to the first site 102 recovering, a resync operation 502 is initiated to transfer the data modifications from the second volume 108 to the first volume 106 so that the first volume 106 can be re-promoted to be the primary volume after being resynced.

During the resync operation 502, the data warehouse 116 at the second site 104 is evaluated to identify mappings between virtual volume block numbers, used by the first volume 106 to reference blocks storing data, to virtual volume block numbers used by the second volume to reference blocks storing corresponding data (corresponding data that is a replica of the data of the first volume 106), during operation 406 of method 400.

During operation 408 of method 400, reverse mapping generation 504 is implemented to generate reverse mappings. The reverse mappings may map the virtual volume block identifiers used by the second volume 108 to the virtual volume block identifiers used by the first volume 106. In some embodiments, the reverse mapping generation 504 generates the reverse mappings using the mappings from the data warehouse 116.

In some embodiments, the data warehouse 116 at the second site 104 is a flat file that is indexed by virtual volume block numbers of the first volume 106. Thus, mappings (entries) within the data warehouse 116 at the second site 104 map the virtual volume block numbers of the first volume 106 to virtual volume block numbers of the second volume 108 that store corresponding data (e.g., a virtual volume block number of the first volume 106 refers to particular data, and is mapped to a virtual volume block number of the second volume 108 that refers to a replicated copy of that data). At the start of the resync operation 502, the data warehouse 116 (e.g., the flat file that is indexed by virtual volume block numbers of the first volume 106) is traversed (walked) to start building a reverse index of reverse mappings. In some embodiments, the data warehouse 116 is read in a linear fashion to build the reverse index as a separate metafile to track reverse mappings. The reverse index may be trained until the resync completes. The time to build the reverse index (metafile) is O(n) where n is a total number of mappings (reverse mappings). Since entries (reverse mappings) are only a few bytes each (e.g., 8 bytes) and are condensed, the O(n) is very quick and efficient. The reverse index of mappings map the virtual volume block numbers of the second volume 108 to virtual volume block numbers of the first volume 106 that store corresponding data. In some embodiments, the reverse index is implemented as a persistent key/value pair mapping file. In some embodiments, the reverse index is efficiently built because the data warehouse 116 is only traversed once. Additionally, lookups of mappings within the reverse index can be performed at a near constant time since merely a lookup of a virtual volume block number is performed at a given index.

Once the reverse mappings are created (e.g., created within the reverse index such as the persistent key/value pair mapping file), the transfer by the resync operation 502 of data modifications from the second volume 108 to the first volume 106 will replicate any changes from the second volume 108 (e.g., the data modifications) to the first volume 106. As part of the transfer, new data blocks of the data modifications are transmitted to the first site 102 to apply to the first volume 106 during a data phase. The new data blocks are transferred and written through a data warehouse file (e.g., a data warehouse at the first site 102 for the first volume 106) during the data phase. The references to these new data blocks and old data blocks (e.g., virtual volume block numbers of the new data blocks and the old data blocks) are transferred in a reference phase. As part of the reference phase, a replication operation is sent from the second site 104 to the first site 102 for each reverse mapping. The replication operation for a data block is updated to include a corresponding virtual volume block number of the first volume 106 used to reference the data block at the first site 102 (e.g., populated with or based upon a reverse mapping). The operation may specify blocks used to store data of a file so that the first site 102 can track and map to the blocks used by the second site 104 to store the data of the file. The corresponding virtual volume block number of the first volume 106 used to reference the data block is obtained from a reverse mapping within the reverse index. The corresponding virtual volume block number within the replication operation enables the first site 102 to perform block sharing at the first volume 106 without having to rebuild the data warehouse for the entire data of the first volume 106.

As an example, a snapshot (S1) of the first volume 106 can include a first data block with a virtual volume block number (1), a second data block with a virtual volume block number (2) and a third data block with a virtual volume block number (3), and there is 1 file referencing these data blocks. The data blocks are transferred from the first site 102 to the second site 104, which are stored at data blocks having a virtual volume block number (10), a virtual volume block number (20), and a virtual volume block number (30). When the first site 102 fails, clients are provided with access to the second volume 108 at the second site 104. A new data block with a virtual volume block number (9) is allocated at the second volume 108, and a new file is created using the virtual volume block number (10), the virtual volume block number (20), and the virtual volume block number (30), which still exist at the first volume 106 (e.g., as virtual volume block numbers (1)-(3)). During a resync from the second site 104, the virtual volume block number (9) is transferred to the first site 102 and a mapping is created within a data warehouse that maps virtual volume block number (9) to a new block for the first volume 106, during a data phase. During a reference phase, a replication operation is sent with a reverse mapping. In this way, the replication operation includes a first entry that comprises a name of the new file, a file block number (1), and a mapping between the virtual volume block number (10) and the virtual volume block number (1); a second entry that comprises the name of the new file, a file block number (2), and a mapping between the virtual volume block number (20) and the virtual volume block number (2); and a third entry that comprises the name of the new file, a file block number (3), and a mapping between the virtual volume block number (30) and the virtual volume block number (3). The virtual volume block numbers (1)-(3) are used to perform block sharing with existing data of the first volume 106 without having to rebuild the data warehouse for the entire dataset.

During operation 410 of method 400, a command 506 is generated for each block being sent from the second site 104 to the first site 102 (e.g., a block of data modifications being resynced from the second volume 108 to the first volume 106 by the resync operation 502). The command 506 comprises the data of the block being resynced from the second volume 108 to the first volume 106 and a reverse mapping for the block. In some embodiments, the command 506 may be constructed as a replication operation that describes an inode (inode number of a file), an offset, a virtual volume block identifier of the second volume 108, and/or other information. In some embodiments, the command 506 may be constructed as a replication operation that describes an inode (inode number of a file), an offset, virtual volume block numbers of the second volume 108, and corresponding virtual volume block numbers of the first volume 106. In some embodiments, the replication operation is constructed during the resync operation 502.

In some embodiments, the reverse mapping generation 504 may determine that the data warehouse 116 lacks a mapping for a virtual volume block number used by the second volume 108. In an example, the data warehouse 116 may lack the mapping for the virtual volume block number because the virtual volume block number is not currently being used at the first site 102. In another example, the data warehouse 116 may lack the mapping for the virtual volume block number because the virtual volume block number was newly allocated as part of an incremental transfer from the second site 104 to the first site 102. Accordingly, a push name data command is transmitted to the first site 102 for performing a share operation.

The command 506 is transmitted to the first site 102 for updating the first volume 106. The data of the block may be stored for the first volume 106. A block sharing operation 508 may be performed to share the block based upon the reverse mapping embedded within the command 506 so that a single instance of the data is stored and can be referenced by any number of times by any number of files (e.g., a reference count for a block of data may be incremented each time the data is referenced, and is decremented each time the data is no longer reference).

Reverse mappings within the commands transmitted from the second site 104 to the first site 102 during the resync operation 502 are used to perform the block sharing operation 508 in order to deduplicate the first volume 106 (e.g., multiple files can point to a same block of data that is stored once instead of multiple times).

In response to the resync operation 502 completing, the second volume 108 is demoted to become the secondary volume and the first volume 106 is promoted to become the primary volume.

In some embodiments of the disclosed techniques, a background pull based data warehouse rebuild is implemented. The background pull based data warehouse rebuild is similar to performing a quick resync of data modifications, and then the data warehouse is built in the background. A data warehouse scanner is implemented at the destination (e.g., a background scanner and/or a snapshot difference scanner). The data warehouse scanner (background scanner or snapshot difference scanner) does a logical scan of a common snapshot (e.g., a snapshot capturing the first volume and the second volume when both volumes store the same data) and performs the follow actions. The data warehouse scanner performs a snapshot difference operation for a common snapshot's public inofile (e.g., a common snapshot being a snapshot that is common between the first volume and the second volume, and the public inofile being an inofile listing inodes of files within the volumes) with a null snapshot. The data warehouse scanner issues a baseline snapshot difference operation (e.g., a compare with null operation) for each changed inode (e.g., an inode of a file that has changed at the second volume after the failure of the first site, thus resulting in a data modification), and a changed vector of information is determined. The changed vector of information includes an inode, a file block number, a destination virtual volume block number, a consistency group size (e.g., a grouping of data that is to be replicated together as a consistency group), etc. The data warehouse scanner issues a baseline snapshot difference operation (e.g., a compare with null operation) for certain files such as private files (special private files).

As part of rebuilding the data warehouse (a data warehouse map), certain information in the entire lifecycle of the rebuild is tracked for each changed virtual volume block number reported by the snapshot difference scanner (e.g., a change virtual volume block number for a block of data of the second volume 108 modified since the failure of the first site 102). Such information may include an inode, a file block number, a destination virtual volume block number, a consistency group size (e.g., a grouping of data that is to be replicated together as a consistency group), etc. For each entry of information (for each entry that includes an inode, a file block number, a destination virtual volume block number, a consistency group size, etc.), a source virtual volume block number is obtained from the source of the transfer such as the second site/second volume. Once a mapping (a virtual volume block number mapping) is received from the source (e.g., received from the second site), a determination is made as to whether the mapping is already present. If the mapping is already present, then no further action is taken. If a one-to-one mapping between source virtual volume block numbers and destination virtual volume block numbers cannot be maintained (e.g., due to differences in consistency group geometry or compression cases), an entry is not populated within the data warehouse. If the mapping is not already present, then an entry within the data warehouse is marked with the mapping.

In some embodiments, a source snapshot of the source volume used for the transfer is locked. Thus, send blocks for a virtual volume block number cannot be received in a data transfer (e.g., a data transfer of a block storing data modifications of the second volume being resynced to the first volume) happening in parallel. Thus, a verification (or an indication is created) for this scenario in a send blocks code module to indicate that an entry within the data warehouse must be a hole while writing to the data warehouse via a send blocks operation.

In some embodiments, race condition occurs with holes where a data warehouse rebuild virtual volume block number mapping of a virtual volume block number (e.g., rebuilding the data warehouse with virtual volume block number mappings) races with the same virtual volume block number being transitioned to a hole as part of a parallel transfer. If the data warehouse mapping is applied first and then the hole is applied, then a consistent result is achieved. Otherwise, a new ondisk flag is set in an indirect of the data warehouse (e.g., an indirect block/point) for each entry while punching (removing/deleting) a hole as part of the transfer. The mapping is applied only if the flag is not set. If the data warehouse indirect is not allocated while punching the hole from the transfer, then an indirect is allocated and the flag is set within the indirect.

Figure 7:
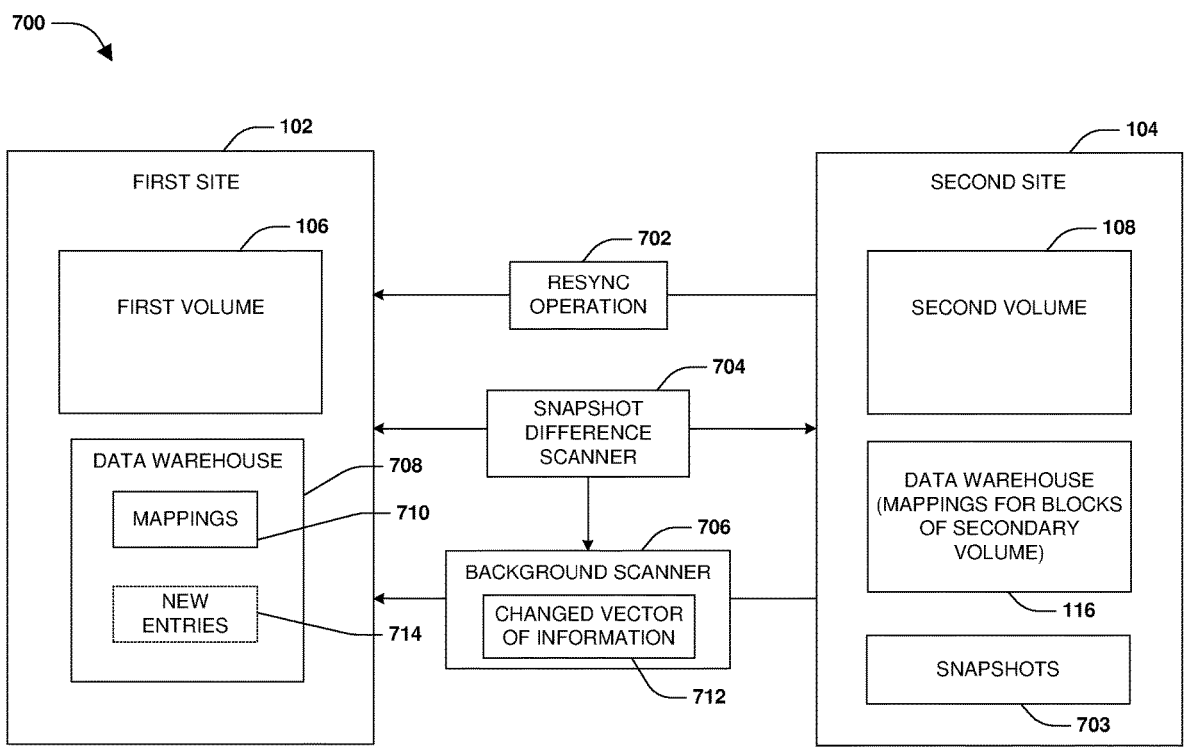
FIG. 7 is a block diagram illustrating an example of a system for performing a resync transfer to recover from a site failure in accordance with an embodiment of the present technology.

FIG. 6 is a flow chart illustrating an example method 400 for performing a resync transfer to recover from a site failure, which is described in conjunction with system 700 of FIG. 7. During operation 602 of method 600, data is replicated from the first volume 106 hosted at the first site 102 as a primary volume to the second volume 108 hosted at the second site 104 as a secondary volume. While the first volume 106 is hosted as the primary volume, client I/O operations may be directed to the primary volume. In some embodiments, the client I/O operations or data of the first volume 106 is replicated (e.g., synchronous replication or asynchronous replication) to the second volume 108 so that the second volume 108 mirrors the first volume 106. The data warehouse 116 is maintained at the second site 104 for the secondary volume 120. The data warehouse 116 is used to track the location of blocks of the secondary volume 120. The data warehouse 116 is populated with mapping of virtual volume block numbers used by the primary volume such as the first volume 106 to virtual volume block numbers used by the secondary volume such as the second volume 108.

A failure may occur at the first site 102 such that the first volume 106 is no longer accessible for client access. In response to the first site 102 experiencing the failure, the second volume 108 is promoted to be the primary volume and client I/O operations are redirected to the second volume 108, during operation 604 of method 600. Some of the client I/O operations (e.g., write operations, delete operations, create operations, etc.) may result in data modifications to the second volume 108 such that the second volume 108 diverges from the first volume 106. In this way, the data warehouse 116 tracks virtual volume block numbers of blocks storing data of the second volume 108 in relation to virtual volume block numbers of corresponding blocks of the first volume 106.

At a subsequent point in time, the first site 102 recovers such that the first volume 106 becomes available for resynchronization with the second volume 108, as illustrated by FIG. 7. In response to the first site 102 recovering, a resync operation 702 is initiated to transfer the data modifications from the second volume 108 to the first volume 106 so that the first volume 106 can be re-promoted to be the primary volume after being resynced. During operation 606 of method 600, a background scanner 706 is executed for rebuilding a data warehouse 708 at the first site 102. The background scanner 706 is executed to track a lifecycle of rebuilding the data warehouse 708 by storing a changed vector of information 712. The changed vector of information 712 is populated with entries, where an entry includes an inode of a file, a file block number, a destination virtual volume block number, and size information such as a consistency group size of a consistency group that includes data, of the file, stored at the destination virtual volume block number and referenced by the file block number.

The background scanner 706 processes changed virtual volume block numbers of the second volume 108 identified by a snapshot difference scanner 704 using one or more snapshots 703. The snapshot difference scanner 704 may compare a first snapshot (e.g., a common snapshot when both the first volume 106 and the second volume 108 were in-sync, and thus the common snapshot captures data common to both volumes) and a second snapshot (e.g., a current snapshot of the second volume 108 after data modifications have occurred) to identify the changed virtual volume block numbers corresponding to the data modifications made to the second volume 108 that are not reflected in the first volume 106.

In some embodiments, the snapshot difference scanner 704 is executed to generate a baseline difference by determining a difference between a null snapshot (e.g., a snapshot of a structure of a volume but without data of the volume) and the common snapshot capturing data common between the first volume 106 and the second volume 108. The snapshot difference scanner 704 may determine the difference as a difference between the null snapshot and a public inofile of the common snapshot (e.g., an inofile populated with inodes of files within a volume whose state is captured by the common snapshot). A baseline difference is issued for each changed inode identified for the second volume 108 (e.g., a changed inode being an inode of a file that changed based upon the data modifications to the second volume 108, which is identified based upon the difference identified by the snapshot difference scanner 704). In some embodiments, a baseline difference is issued for each changed inode identified for the second volume 108 to determine the changed vector of information 712 populated with the entries that each include an inode (e.g., an inode number of a changed file), a file block number, a destination virtual volume block number, and size information.

For a changed virtual volume block number of the second volume 108, the background scanner 706 obtains a source volume block number of the first volume 106 from the first site 102, during operation 608 of method 600. The source volume block number may be retrieved for an entry within the changed vector of information 712 for determining whether a new mapping is to be created as a new entry within the data warehouse 708. The new mapping (the new entry) is created based upon whether the data warehouse 708 already comprises a mapping, within existing mappings 710, between the changed virtual volume block number and the source virtual volume block number.

During operation 610 of method 600, the new entry is created as part of the background scanner 706 creating new entries 714 (new mappings) within the data warehouse 708 based upon the data warehouse 708 not already comprising a mapping between the changed virtual volume block number and the source virtual volume block number. The new entry is created to generate a mapping between the changed virtual volume block number and the source virtual volume block number. In this way, when the block of modified data is resynced by the resync operation 702 from the second volume 108 to the first volume 106, the mapping is used to perform block sharing for any files referencing the modified data of the block. If the data warehouse 708 already comprises the mapping between the changed virtual volume block number and the source virtual volume block number, then the mapping is retained within the data warehouse 708 and no new entry/mapping is created.

In some embodiments, a one to one mapping between source volume block numbers and destination volume block numbers cannot be maintained such as due to compression differences (e.g., data may be compressed into blocks that are arranged differently at the first site 102 and the second site 104), consistency group geometry differences (e.g., a structure of how files and directories of a consistency group at the first site 102 may be different than how the files and directories are structured at the second site 104). If the one to one mapping between the source volume block numbers and the destination volume block numbers cannot be maintained, then the new entry is not populated within the data warehouse 708 (e.g., the new entry is not created, discarded, or blocked through a blocking mechanism from being populated into the data warehouse 708).

In some embodiments, the data warehouse 708 is utilized to perform block sharing of data within the first volume 106. In some embodiments, the data warehouse 708 is utilized to deduplicate data within the first volume 106.

In some embodiments of performing the overall resync, a send blocks operation is received such as by the first site 102 from the second site 104. An entry within the data warehouse 708 is verified as whether the entry is a hole as part of writing to the data warehouse 708 via the send blocks operation. In some embodiments, the send blocks operation is for a virtual volume block number. A verification is performed to verify that the changed data of the virtual volume block number (e.g., changed data within the second volume 108 to resync to the first volume 106) is not being received in parallel with the send blocks operation.

Hole punching is the process of removing spare blocks (holes) from copied blocks such as after a copy operation (e.g., a copy offload operation). An entry within the date warehouse 708 may be created for a virtual volume block number before the resync operation 702 transitions the virtual volume block number to a hole. Accordingly, a flag is set in an indirect (e.g., an indirect block/pointer) in the data warehouse 708 for the entry while setting the hole as part of the resync operation 702. In some embodiments, a mapping may be applied to the data warehouse 078 for the virtual volume block number based upon the flag not being set. The mapping is not applied to the data warehouse 708 for the virtual block number based upon the flag being set (e.g., the data warehouse 708 is evaluated to determine whether the flag is set, and the mapping is not generated, is discarded, or is blocked from being populated within the data warehouse 708). In some embodiments, a determination is made that the indirect of the data warehouse 708 is not allocated while removing a hole as part of the resync operation 702. Accordingly, the indirect is allocated and the flag is set within the indirect.

In some embodiments, a method is provided. The method includes replicating data from a first volume hosted at a first site as a primary volume to a second volume hosted at a second site as a secondary volume; in response to the first site experiencing a failure, promoting the second volume to be the primary volume and directing client I/O to the second volume for storing data modifications; in response to the first site recovering, initiating a resync operation to transfer the data modifications from the second volume to the first volume for re-promoting the first volume to be the primary volume; and during the resync operation: logging database rebuild operations, for rebuilding a database file used to track blocks that are shared by files of at least one of the first volume or the second volume, into a log metafile; and implementing a background scanner to reconcile information within the log metafile for rebuilding the database file.

In some embodiments, the method includes representing a data warehouse, used to track locations of blocks within at least one of the first volume or the second volume, utilizing both the database file and the log metafile; and utilizing both the database file and the log metafile to obtain a consistent state of at least one of the first volume or the second volume.

In some embodiments, the method includes evaluating the log metafile to determine whether a block has been processed as part of the resync operation.

In some embodiments, the method includes utilizing the log metafile and the database file to deduplicate blocks storing data of the first volume.

In some embodiments, the method includes in response to the resync operation completing, demoting the second volume to become the secondary volume and promoting the first volume to become the primary volume.

In some embodiments, the method includes maintaining a data warehouse for the secondary volume, wherein the data warehouse tracks blocks storing data of the secondary volume.

In some embodiments, virtual volume block number mappings are logged into the log metafile.

In some embodiments, the method includes populating a data warehouse maintained at the second site for the secondary volume with virtual volume block numbers used by the first volume.

In some embodiments, the method includes populating a data warehouse maintained at the second site for the secondary volume with mappings between virtual volume block numbers, used by the first volume for storing the data, to locations used by the second volume for storing corresponding data.

In some embodiments, a computing device is provided. The computing device includes a memory storing instructions and a processor coupled to the memory, the processor configured to execute the instructions to perform operations. The operations include replicating data from a first volume hosted at a first site as a primary volume to a second volume hosted at a second site as a secondary volume; in response to the first site experiencing a failure, promoting the second volume to be the primary volume and directing client I/O to the second volume for storing data modifications; in response to the first site recovering, initiating a resync operation to transfer the data modifications from the second volume to the first volume for re-promoting the first volume to be the primary volume; and during the resync operation: logging database rebuild operations, for rebuilding a database file used to track blocks that are shared by files of at least one of the first volume or the second volume, into a log metafile; and implementing a background scanner to reconcile information within the log metafile for rebuilding the database file.

In some embodiments, the operations include logging virtual volume block numbers from the second site into the log metafile indexed by the virtual volume block numbers and mapped to virtual volume block numbers used by the first site.

In some embodiments, the operations include logging virtual volume block numbers from the second site into the log metafile indexed by the virtual volume block numbers, wherein the indexes are at fixed offsets and a maximum number of indices is derived from a largest virtual volume block number from the second site.

In some embodiments, the operations include specifying that the resync operation is complete in response to virtual volume block numbers from the second site being logged into the log metafile.

In some embodiments, the operations include asynchronously processing map entries within the log metafile, wherein for each map entry from the second volume to the first volume, a block share is performed between a file block number within a data warehouse for the second volume to a container file block number associated with the first volume.

In some embodiments, non-transitory machine readable medium is provided. The non-transitory machine readable medium comprises instructions for performing a method, which when executed by a machine, causes the machine to perform operations. The operations include replicating data from a first volume hosted at a first site as a primary volume to a second volume hosted at a second site as a secondary volume; in response to the first site experiencing a failure, promoting the second volume to be the primary volume and directing client I/O to the second volume for storing data modifications; in response to the first site recovering, initiating a resync operation to transfer the data modifications from the second volume to the first volume for re-promoting the first volume to be the primary volume; and during the resync operation: logging database rebuild operations, for rebuilding a database file used to track blocks that are shared by files of at least one of the first volume or the second volume, into a log metafile; and implementing a background scanner to reconcile information within the log metafile for rebuilding the database file.

In some embodiments, the operations include asynchronously processing map entries within the log metafile, wherein for each map entry from the second volume to the first volume, a block share is performed between a file block number within a data warehouse for the second volume to a container file block number associated with the first volume.

In some embodiments, the operations include populating a data warehouse maintained at the second site for the secondary volume with virtual volume block numbers used by the first volume.

In some embodiments, the operations include populating a data warehouse maintained at the second site for the secondary volume with mappings between virtual volume block numbers, used by the first volume for storing the data, to locations used by the second volume for storing corresponding data.

In some embodiments, the operations include logging virtual volume block numbers from the second site into the log metafile indexed by the virtual volume block numbers and mapped to virtual volume block numbers used by the first site.

In some embodiments, the operations include logging virtual volume block numbers from the second site into the log metafile indexed by the virtual volume block numbers, wherein the indexes are at fixed offsets and a maximum number of indices is derived from a largest virtual volume block number from the second site.

In some embodiments, a method is provided. The method includes in response to a first site, hosting a first volume as a primary volume, experiencing a failure, promoting a second volume, hosted by a second site as a secondary volume, to be the primary volume and directing client I/O to the second volume for storing data modifications; and in response to the first site recovering, initiating a resync operation to transfer the data modifications from the second volume to the first volume for re-promoting the first volume to be the primary volume; and during the resync operation: evaluating a data warehouse maintained at the second site to identifying mappings between virtual volume block numbers used by the first volume to virtual volume block numbers used by the second volume; generating reverse mappings, mapping the virtual volume block numbers used by the second volume to the virtual volume block numbers used by the first volume, based upon the mappings from the data warehouse; and for each block being sent from the second site to the first site, generating and sending a command, including data of a block and a reverse mapping for the block, to the first site for updating the first volume.

In some embodiments, the method includes in response to receiving the command at the first site, performing a block sharing operation to share the block based upon the reverse mapping embedded within the command.

In some embodiments, the method includes constructing the command as a replication operation that describes an inode number, an offset, and a virtual volume block number of the second volume.

In some embodiments, the method includes constructing, during the resync operation, a replication operation that describes an inode number, an offset, virtual volume block numbers of the second volume, and corresponding virtual volume block numbers of the first volume.

In some embodiments, the method includes utilizing the reverse mappings within commands transmitted from the second site to the first site during the resync operation to perform deduplication for the first volume.

In some embodiments, the method includes utilizing the reverse mappings within commands transmitted from the second site to the first site during the resync operation to preserve, at the first site, block sharing performed at the second site.

In some embodiments, the method includes in response to determining that the data warehouse lacks a mapping for a virtual volume block number used by the second volume, transmitting a push name data command to the first site for performing a share operation.

In some embodiments, the method includes in response to determining that the data warehouse lacks a mapping for a virtual volume block number used by the second volume based upon the virtual volume block number not being used at the first site, transmitting a push name data command to the first site for performing a share operation.

In some embodiments, the method includes in response to determining that the data warehouse lacks a mapping for a virtual volume block number used by the second volume based upon the virtual volume block number being newly allocated as part of an incremental transfer from the second site to the first site, transmitting a push name data command to the first site for performing a share operation.

In some embodiments, a computing device is provided. The computing device includes a memory storing instructions and a processor coupled to the memory, the processor configured to execute the instructions to perform operations. The operations include in response to a first site, hosting a first volume as a primary volume, experiencing a failure, promoting a second volume, hosted by a second site as a secondary volume, to be the primary volume and directing client I/O to the second volume for storing data modifications; and in response to the first site recovering, initiating a resync operation to transfer the data modifications from the second volume to the first volume for re-promoting the first volume to be the primary volume; and during the resync operation: evaluating a data warehouse maintained at the second site to identifying mappings between virtual volume block numbers used by the first volume to virtual volume block numbers used by the second volume; generating reverse mappings, mapping the virtual volume block numbers used by the second volume to the virtual volume block numbers used by the first volume, based upon the mappings from the data warehouse; and for each block being sent from the second site to the first site, generating and sending a command, including data of a block and a reverse mapping for the block, to the first site for updating the first volume.

In some embodiments, the operations include in response to the resync operation completing, demoting the second volume to become the secondary volume and promoting the first volume to become the primary volume.

In some embodiments, the operations include in response to receiving the command at the first site, performing a block sharing operation to share the block based upon the reverse mapping embedded within the command.

In some embodiments, the operations include constructing the command as a replication operation that describes an inode number, an offset, and a virtual volume block number of the second volume.

In some embodiments, the operations include constructing, during the resync operation, a replication operation that describes an inode number, an offset, virtual volume block numbers of the second volume, and corresponding virtual volume block numbers of the first volume.

In some embodiments, the operations include utilizing the reverse mappings within commands transmitted from the second site to the first site during the resync operation to perform deduplication for the first volume.

In some embodiments, non-transitory machine readable medium is provided. The non-transitory machine readable medium comprises instructions for performing a method, which when executed by a machine, causes the machine to perform operations. The operations include in response to a first site, hosting a first volume as a primary volume, experiencing a failure, promoting a second volume, hosted by a second site as a secondary volume, to be the primary volume and directing client I/O to the second volume for storing data modifications; and in response to the first site recovering, initiating a resync operation to transfer the data modifications from the second volume to the first volume for re-promoting the first volume to be the primary volume; and during the resync operation: evaluating a data warehouse maintained at the second site to identifying mappings between virtual volume block numbers used by the first volume to virtual volume block numbers used by the second volume; generating reverse mappings, mapping the virtual volume block numbers used by the second volume to the virtual volume block numbers used by the first volume, based upon the mappings from the data warehouse; and for each block being sent from the second site to the first site, generating and sending a command, including data of a block and a reverse mapping for the block, to the first site for updating the first volume.

In some embodiments, the operations include utilizing the reverse mappings within commands transmitted from the second site to the first site during the resync operation to preserve, at the first site, block sharing performed at the second site.

In some embodiments, the operations include in response to determining that the data warehouse lacks a mapping for a virtual volume block number used by the second volume, transmitting a push name data command to the first site for performing a share operation.

In some embodiments, the operations include in response to determining that the data warehouse lacks a mapping for a virtual volume block number used by the second volume based upon the virtual volume block number not being used at the first site, transmitting a push name data command to the first site for performing a share operation.

In some embodiments, the operations include in response to determining that the data warehouse lacks a mapping for a virtual volume block number used by the second volume based upon the virtual volume block number being newly allocated as part of an incremental transfer from the second site to the first site, transmitting a push name data command to the first site for performing a share operation.

In some embodiments, a method is provided. The method includes in response to a first site, hosting a first volume as a primary volume, experiencing a failure, promoting a second volume, hosted by a second site as a secondary volume, to be the primary volume and directing client I/O to the second volume for storing data modifications; and in response to the first site recovering, initiating a resync operation to transfer the data modifications from the second volume to the first volume for re-promoting the first volume to be the primary volume; and executing a background scanner to rebuild a data warehouse at the first site by: for a changed virtual volume block number of the second volume identified by a snapshot difference scanner using one or more snapshots, obtaining a source virtual volume block number from the first site; and in response to determining that the data warehouse does not comprise a mapping between the changed virtual volume block number and the source virtual volume block number, creating an entry within the data warehouse to create the mapping between the changed virtual volume block number and the source virtual volume block number.

In some embodiments, the method includes executing the background scanner to track a lifecycle of rebuilding the data warehouse by storing a changed vector of information with entries that include an inode, a file block number, a destination virtual volume block number, and size information; and retrieving source virtual volume block numbers for an entry within the changed vector of information to determine whether a new mapping is to be created within the data warehouse.

In some embodiments, the method includes in response to determining that the data warehouse comprises the mapping between the changed virtual volume block number and the source virtual volume block number, retaining the mapping within the data warehouse.

In some embodiments, the method includes in response to determining that there is a consistency group geometry difference between the first volume and the second volume resulting a lack of a one to one mapping between source and destination virtual volume block numbers, refraining from populating the entry within the data warehouse.

In some embodiments, the method includes in response to determining that there is a compression difference between the first volume and the second volume resulting a lack of a one to one mapping between source and destination virtual volume block numbers, refraining from populating the entry within the data warehouse.

In some embodiments, the method includes executing the snapshot difference scanner to generate a baseline difference by determining a difference between a null snapshot and a common snapshot between the first site and the second site.

In some embodiments, the method includes executing the snapshot difference scanner to generate a baseline difference by determining a difference between a null snapshot and a public inofile of a common snapshot between the first site and the second site.

In some embodiments, the method includes generating, by the snapshot difference scanner, a baseline difference by determining a difference between a null snapshot and a inofile of a common snapshot between the first site and the second site; issuing the baseline difference for each changed inode identified for the second volume to determine a changed vector of information; and retrieving source virtual volume block numbers for an entry within the changed vector of information to determine whether a new mapping is to be created within the data warehouse.

In some embodiments, the method includes issuing a baseline difference for each changed inode identified for the second volume to determine a changed vector of information with entries that include an inode, a file block number, a destination virtual volume block number, and size information; and retrieving source virtual volume block numbers for an entry within the changed vector of information to determine whether a new mapping is to be created within the data warehouse.

In some embodiments, the method includes utilizing the data warehouse to perform block sharing of data within the first volume.

In some embodiments, a computing device is provided. The computing device includes a memory storing instructions and a processor coupled to the memory, the processor configured to execute the instructions to perform operations. The operations include in response to a first site, hosting a first volume as a primary volume, experiencing a failure, promoting a second volume, hosted by a second site as a secondary volume, to be the primary volume and directing client I/O to the second volume for storing data modifications; and in response to the first site recovering, initiating a resync operation to transfer the data modifications from the second volume to the first volume for re-promoting the first volume to be the primary volume; and executing a background scanner to rebuild a data warehouse at the first site by: for a changed virtual volume block number of the second volume identified by a snapshot difference scanner using one or more snapshots, obtaining a source virtual volume block number from the first site; and in response to determining that the data warehouse does not comprise a mapping between the changed virtual volume block number and the source virtual volume block number, creating an entry within the data warehouse to create the mapping between the changed virtual volume block number and the source virtual volume block number.

In some embodiments, the operations include utilizing the data warehouse to deduplicate data within the first volume.

In some embodiments, the operations include receiving a send blocks operation; and verifying that an entry within the data warehouse is a hole as part of writing to the data warehouse via the send blocks operation.

In some embodiments, the operations include receiving a send blocks operation for a virtual volume block number; and verifying that changed data of the virtual volume block number is not being received in parallel with the send blocks operation.

In some embodiments, the operations include in response to creating an entry within the data warehouse for a virtual volume block number before the resync operation transitions the virtual volume block number to a hole, setting a flag within an indirect in the data warehouse for each entry while setting the hole as part of the resync operation.

In some embodiments, non-transitory machine readable medium is provided. The non-transitory machine readable medium comprises instructions for performing a method, which when executed by a machine, causes the machine to perform operations. The operations include in response to a first site, hosting a first volume as a primary volume, experiencing a failure, promoting a second volume, hosted by a second site as a secondary volume, to be the primary volume and directing client I/O to the second volume for storing data modifications; and in response to the first site recovering, initiating a resync operation to transfer the data modifications from the second volume to the first volume for re-promoting the first volume to be the primary volume; and executing a background scanner to rebuild a data warehouse at the first site by: for a changed virtual volume block number of the second volume identified by a snapshot difference scanner using one or more snapshots, obtaining a source virtual volume block number from the first site; and in response to determining that the data warehouse does not comprise a mapping between the changed virtual volume block number and the source virtual volume block number, creating an entry within the data warehouse to create the mapping between the changed virtual volume block number and the source virtual volume block number.

In some embodiments, the operations include in response to creating an entry within the data warehouse for a virtual volume block number before the resync operation transitions the virtual volume block number to a hole, setting a flag within an indirect in the data warehouse for one or more entries while setting the hole as part of the resync operation; and applying a mapping to the data warehouse for the virtual volume block number based upon the flag not being set.

In some embodiments, the operations include in response to creating an entry within the data warehouse for a virtual volume block number before the resync operation transitions the virtual volume block number to a hole, setting a flag within an indirect in the data warehouse for one or more entries while setting the hole as part of the resync operation; and refraining from applying a mapping to the data warehouse for the virtual volume block number based upon the flag being set.

In some embodiments, the operations include in response to determining that an indirect of the data warehouse is not allocated while removing a hole as part of the resync operation, allocating the indirect; and setting a flag within the indirect.

In some embodiments, the operations include utilizing the data warehouse to perform block sharing of data within the first volume.

Figure 8:
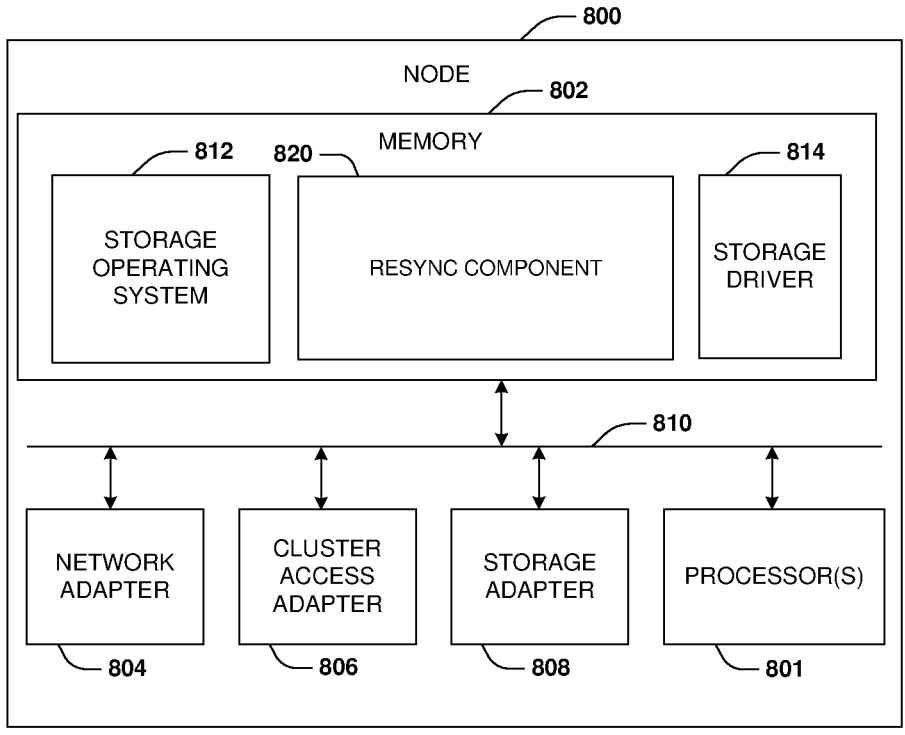
FIG. 8 is a block diagram illustrating an example of a node in accordance with an embodiment of the present technology.

Referring to FIG. 8, a node 800 (also referred to as a storage node) in this particular example includes processor (s) 801, a memory 802, a network adapter 804, a cluster access adapter 806, and a storage adapter 808 interconnected by a system bus 810. In other examples, the node 800 comprises a virtual machine, such as a virtual storage machine.

The node 800 also includes a storage operating system 812 installed in the memory 802 that can, for example, implement a RAID data loss protection and recovery scheme to optimize reconstruction of data of a failed disk or drive in an array, along with other functionality such as deduplication, compression, snapshot creation, data mirroring, synchronous replication, asynchronous replication, encryption, etc.

The network adapter 804 in this example includes the mechanical, electrical and signaling circuitry needed to connect the node 800 to one or more of the client devices over network connections, which may comprise, among other things, a point-to-point connection or a shared medium, such as a local area network. In some examples, the network adapter 804 further communicates (e.g., using Transmission Control Protocol/Internet Protocol (TCP/IP)) via a cluster fabric and/or another network (e.g., a WAN (Wide Area Network)) (not shown) with storage devices of a distributed storage system to process storage operations associated with data stored thereon.

The storage adapter 808 cooperates with the storage operating system 812 executing on the node 800 to access information requested by one of the client devices (e.g., to access data on a data storage device managed by a network storage controller). The information may be stored on any type of attached array of writeable media such as magnetic disk drives, flash memory, and/or any other similar media adapted to store information.

In exemplary data storage devices, information can be stored in data blocks on disks. The storage adapter 808 can include I/O interface circuitry that couples to the disks over an I/O interconnect arrangement, such as a storage area network (SAN) protocol (e.g., Small Computer System Interface (SCSI), Internet SCSI (iSCSI), hyperSCSI, Fiber Channel Protocol (FCP)). The information is retrieved by the storage adapter 808 and, if necessary, processed by the processor(s) 801 (or the storage adapter 808 itself) prior to being forwarded over the system bus 810 to the network adapter 804 (and/or the cluster access adapter 806 if sending to another node computing device in the cluster) where the information is formatted into a data packet and returned to a requesting one of the client devices and/or sent to another node computing device attached via a cluster fabric. In some examples, a storage driver 814 in the memory 802 interfaces with the storage adapter to facilitate interactions with the data storage devices.

The storage operating system 812 can also manage communications for the node 800 among other devices that may be in a clustered network, such as attached to the cluster fabric. Thus, the node 800 can respond to client device requests to manage data on one of the data storage devices or storage devices of the distributed storage system in accordance with the client device requests.

The node 800 may implement a resync component 820 configured to perform the techniques described herein such as in relation to FIGS. 1A-1C and FIGS. 2-7. For example, the resync component 820 may perform the resync operation 130, generate a data warehouse rebuild operation 132, rebuild a data warehouse 134, implement a background scanner 310, generate commands 506, implement a background scanner 706, perform the method 200 of FIG. 2, perform the method 400 of FIG. 4, and/or perform the method 600 of FIG. 6.

In the example node 800, memory 802 can include storage locations that are addressable by the processor(s) 801 and adapters 804, 806, and 808 for storing related software application code and data structures. The processor(s) 801 and adapters 804, 806, and 808 may, for example, include processing elements and/or logic circuitry configured to execute the software code and manipulate the data structures.

The storage operating system 812, portions of which are typically resident in the memory 802 and executed by the processor(s) 801, invokes storage operations in support of a file service implemented by the node 800. Other processing and memory mechanisms, including various computer readable media, may be used for storing and/or executing application instructions pertaining to the techniques described and illustrated herein.

The examples of the technology described and illustrated herein may be embodied as one or more non-transitory computer or machine readable media, such as the memory 802, having machine or processor-executable instructions stored thereon for one or more aspects of the present technology, which when executed by processor(s), such as processor(s) 801, cause the processor(s) to carry out the steps necessary to implement the methods of this technology, as described and illustrated with the examples herein. In some examples, the executable instructions are configured to perform one or more steps of a method described and illustrated later.

Figure 9:
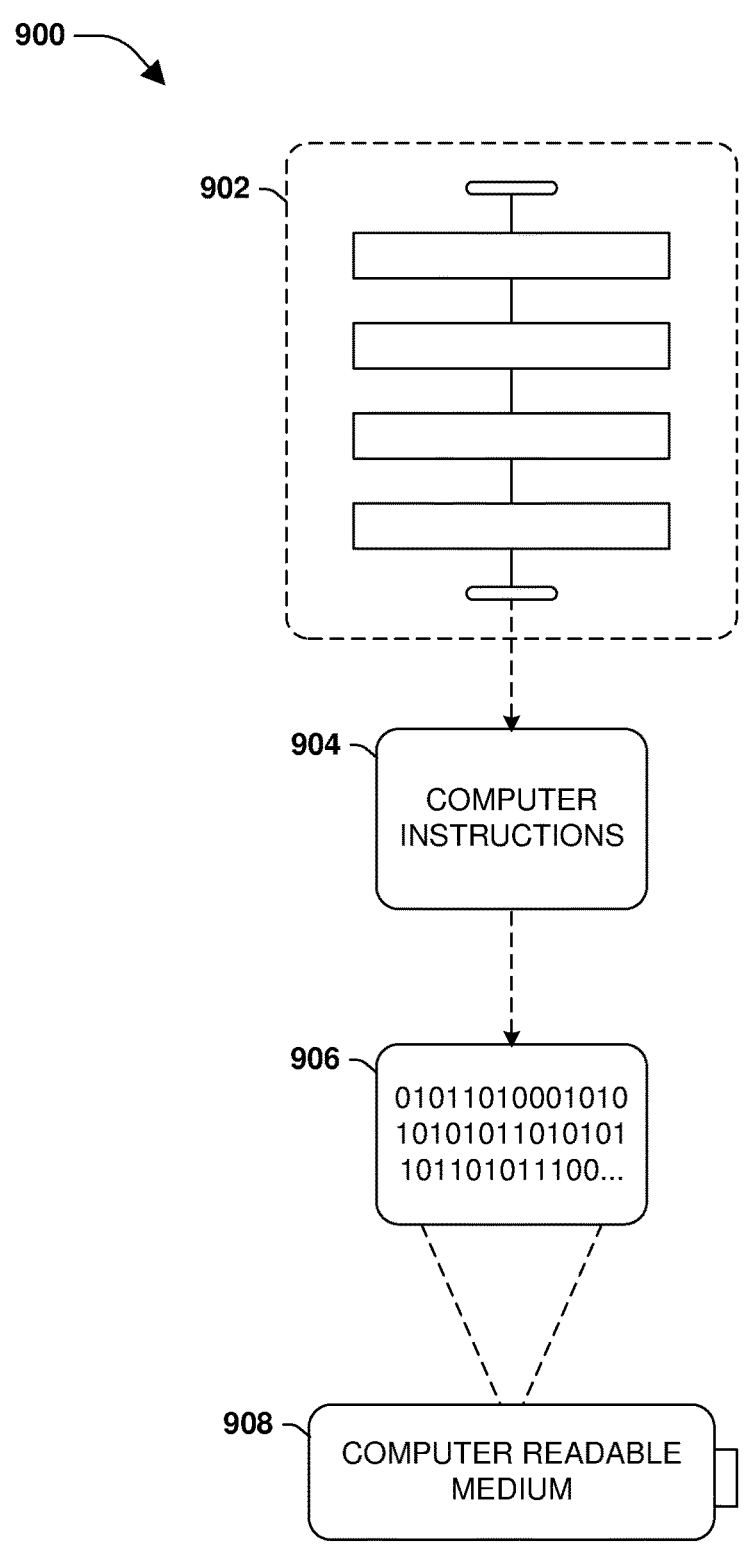
FIG. 9 is an example of a computer readable medium in which an embodiment of the present technology may be implemented.

Still another embodiment involves a computer-readable medium 900 comprising processor-executable instructions configured to implement one or more of the techniques presented herein. An example embodiment of a computer-readable medium or a computer-readable device that is devised in these ways is illustrated in FIG. 9, wherein the implementation comprises a computer-readable medium 908, such as a compact disc-recordable (CD-R), a digital versatile disc-recordable (DVD-R), flash drive, a platter of a hard disk drive, etc., on which is encoded computer-readable data 906. This computer-readable data 906, such as binary data comprising at least one of a zero or a one, in turn comprises processor-executable computer instructions 904 configured to operate according to one or more of the principles set forth herein. In some embodiments, the processor-executable computer instructions 904 are configured to perform a method 902 such as method 200 of FIG. 2, method 400 of FIG. 4, and/or method 600 of FIG. 6. In some embodiments, the processor-executable computer instructions 904 are configured to implement a system such as system 300 of FIG. 3, system 500 of FIG. 5, and/or system 700 of FIG. 7. Many such computer-readable media are contemplated to operate in accordance with the techniques presented herein.

In an embodiment, the described methods and/or their equivalents may be implemented with computer executable instructions. Thus, in an embodiment, a non-transitory computer readable/storage medium is configured with stored computer executable instructions of an algorithm/computer application that when executed by a machine(s) cause the machine(s) (and/or associated components) to perform the method. Example machines include but are not limited to a processor, a computer, a server operating in a cloud computing system, a server configured in a Software as a Service (Saas) architecture, a smart phone, and so on. In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW) s, DVDs, cassettes, magnetic tape, magnetic disk storage, optical or non-optical data storage devices and/or any other medium which can be used to store data.

Some examples of the claimed subject matter have been described with reference to the drawings, where like reference numerals are generally used to refer to like elements throughout. In the description, for purposes of explanation, numerous specific details are set forth in order to provide an understanding of the claimed subject matter. It may be evident, however, that the claimed subject matter may be practiced without these specific details. Nothing in this detailed description is admitted as prior art.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:

replicating data from a first volume hosted at a first site as a primary volume to a second volume hosted at a second site as a secondary volume;

in response to the first site experiencing a failure, promoting the second volume to be the primary volume and directing client I/O to the second volume for storing data modifications;

in response to the first site recovering, initiating a resync operation to transfer the data modifications from the second volume to the first volume for re-promoting the first volume to be the primary volume; and during the resync operation:

logging database rebuild operations, for rebuilding a database file used to track blocks that are shared by files of at least one of the first volume or the second volume, into a log metafile that includes mappings between virtual volume block numbers of the second volume and virtual volume block numbers of the first volume; and implementing a background scanner to reconcile information within the log metafile for rebuilding the database file, wherein the background scanner processes the mappings to perform block share operations to share file block numbers between the second volume and the first volume.

2. The method of claim 1, comprising:

representing a data warehouse, used to track locations of blocks within at least one of the first volume or the second volume, utilizing both the database file and the log metafile; and utilizing both the database file and the log metafile to obtain a consistent state of at least one of the first volume or the second volume.

3. The method of claim 1, comprising:

evaluating the log metafile to determine whether a block has been processed as part of the resync operation.

4. The method of claim 1, comprising:

utilizing the log metafile and the database file to deduplicate blocks storing data of the first volume.

5. The method of claim 1, comprising:

in response to the resync operation completing, demoting the second volume to become the secondary volume and promoting the first volume to become the primary volume.

6. The method of claim 1, comprising:

maintaining a data warehouse for the secondary volume, wherein the data warehouse tracks blocks storing data of the secondary volume.

7. The method of claim 1, wherein virtual volume block number mappings are logged into the log metafile.

8. The method of claim 1, comprising:

populating a data warehouse maintained at the second site for the secondary volume with virtual volume block numbers used by the first volume.

9. The method of claim 1, comprising:

populating a data warehouse maintained at the second site for the secondary volume with mappings between virtual volume block numbers, used by the first volume for storing the data, to locations used by the second volume for storing corresponding data.

10. A computing device comprising:

a memory storing instructions; and a processor coupled to the memory, the processor configured to execute the instructions to perform operations comprising:

replicating data from a first volume hosted at a first site as a primary volume to a second volume hosted at a second site as a secondary volume;

in response to the first site experiencing a failure, promoting the second volume to be the primary volume and directing client I/O to the second volume for storing data modifications;

in response to the first site recovering, initiating a resync operation to transfer the data modifications from the second volume to the first volume for re-promoting the first volume to be the primary volume; and during the resync operation:

logging database rebuild operations, for rebuilding a database file used to track blocks that are shared by files of at least one of the first volume or the second volume, into a log metafile that includes mappings between virtual volume block numbers of the second volume and virtual volume block numbers of the first volume; and implementing a background scanner to reconcile information within the log metafile for rebuilding the database file, wherein the background scanner processes the mappings to perform block share operations to share file block numbers between the second volume and the first volume.

11. The computing device of claim 10, wherein the operations comprise:

logging virtual volume block numbers from the second site into the log metafile indexed by the virtual volume block numbers and mapped to virtual volume block numbers used by the first site.

12. The computing device of claim 10, wherein the operations comprise:

logging virtual volume block numbers from the second site into the log metafile indexed by the virtual volume block numbers, wherein the indexes are at fixed offsets and a maximum number of indices is derived from a largest virtual volume block number from the second site.

13. The computing device of claim 10, wherein the operations comprise:

specifying that the resync operation is complete in response to virtual volume block numbers from the second site being logged into the log metafile.

14. The computing device of claim 10, wherein the operations comprise:

asynchronously processing map entries within the log metafile, wherein for each map entry from the second volume to the first volume, a block share is performed between a file block number within a data warehouse for the second volume to a container file block number associated with the first volume.

15. A non-transitory machine readable medium comprising instructions for performing a method, which when executed by a machine, causes the machine to perform operations comprising:

replicating data from a first volume hosted at a first site as a primary volume to a second volume hosted at a second site as a secondary volume;

in response to the first site experiencing a failure, promoting the second volume to be the primary volume and directing client I/O to the second volume for storing data modifications;

in response to the first site recovering, initiating a resync operation to transfer the data modifications from the second volume to the first volume for re-promoting the first volume to be the primary volume; and during the resync operation:

logging database rebuild operations, for rebuilding a database file used to track blocks that are shared by files of at least one of the first volume or the second volume, into a log metafile that includes mappings between virtual volume block numbers of the second volume and virtual volume block numbers of the first volume; and implementing a background scanner to reconcile information within the log metafile for rebuilding the database file, wherein the background scanner processes the mappings to perform block share operations to share file block numbers between the second volume and the first volume.

16. The non-transitory machine readable medium of claim 15, wherein the operations comprise:

asynchronously processing map entries within the log metafile, wherein for each map entry from the second volume to the first volume, a block share is performed between a file block number within a data warehouse for the second volume to a container file block number associated with the first volume.

17. The non-transitory machine readable medium of claim 15, wherein the operations comprise:

populating a data warehouse maintained at the second site for the secondary volume with virtual volume block numbers used by the first volume.

18. The non-transitory machine readable medium of claim 15, wherein the operations comprise:

populating a data warehouse maintained at the second site for the secondary volume with mappings between virtual volume block numbers, used by the first volume for storing the data, to locations used by the second volume for storing corresponding data.

19. The non-transitory machine readable medium of claim 15, wherein the operations comprise:

logging virtual volume block numbers from the second site into the log metafile indexed by the virtual volume block numbers and mapped to virtual volume block numbers used by the first site.

20. The non-transitory machine readable medium of claim 15, wherein the operations comprise:

logging virtual volume block numbers from the second site into the log metafile indexed by the virtual volume block numbers, wherein the indexes are at fixed offsets and a maximum number of indices is derived from a largest virtual volume block number from the second site.

* * * * *